United States Patent [19]

Nanni et al.

[11] Patent Number: 4,483,050
[45] Date of Patent: Nov. 20, 1984

[54] SPRING-RING CLOSURES FOR NECKLACE-COLLARS BRACELETS AND OTHERS

[75] Inventors: Maurizio Nanni; Valdo Sestini, both of Arezzo, Italy

[73] Assignee: Uno-A-Erre Italia S.p.A., Arezzo, Italy

[21] Appl. No.: 412,212

[22] Filed: Aug. 27, 1982

[30] Foreign Application Priority Data

Sep. 8, 1981 [IT] Italy ................................ 9509 A/81

[51] Int. Cl.³ ............................................. A44B 13/02
[52] U.S. Cl. ........................................... 24/239; 24/238
[58] Field of Search ............... 24/234, 235, 236, 238, 24/239, 240, 241 R, 241 SL

[56] References Cited

U.S. PATENT DOCUMENTS

| | | | |
|---|---|---|---|
| 659,425 | 10/1900 | White | 24/239 |
| 1,057,532 | 4/1913 | Elliott | 24/239 |
| 1,442,096 | 1/1923 | Robinson | 24/239 |
| 1,842,040 | 1/1932 | McConnell | 24/241 PS |
| 2,604,775 | 7/1952 | Le Blanc | 24/238 X |
| 3,984,900 | 10/1976 | Cirelli | 24/238 |

Primary Examiner—William E. Lyddane
Assistant Examiner—Peter A. Aschenbrenner
Attorney, Agent, or Firm—Hopgood, Calimafde, Kalil, Blaustein & Judlowe

[57] ABSTRACT

A closure for necklace, bracelet or the like comprising a spring-ring with a gapped annular or similar form and a sliding catch therein actuated by a spring contained therein, the closure having a lug with two approximately parallel generally flat laminar portions extending substantially parallel to each other and connected to the spring ring to which they are soldered or welded, the lug having means for connection to one end of a necklace, bracelet or the like.

1 Claim, 11 Drawing Figures

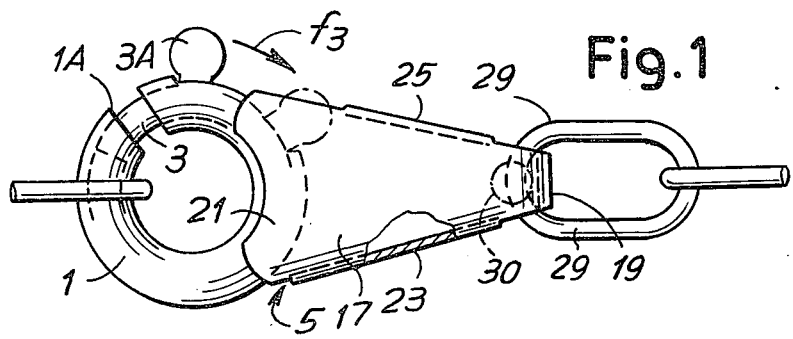
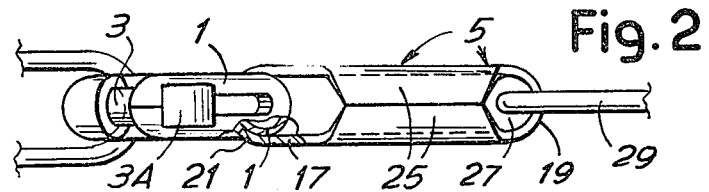
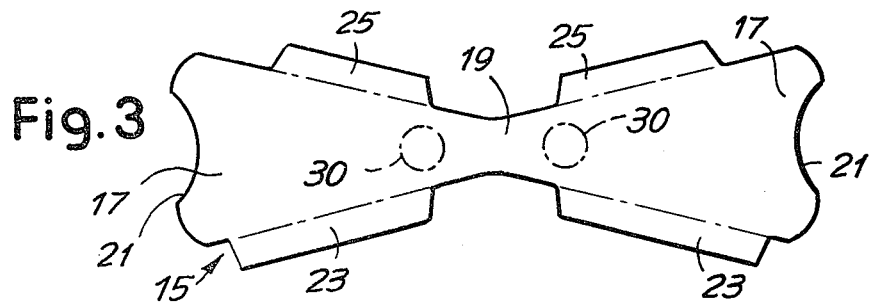
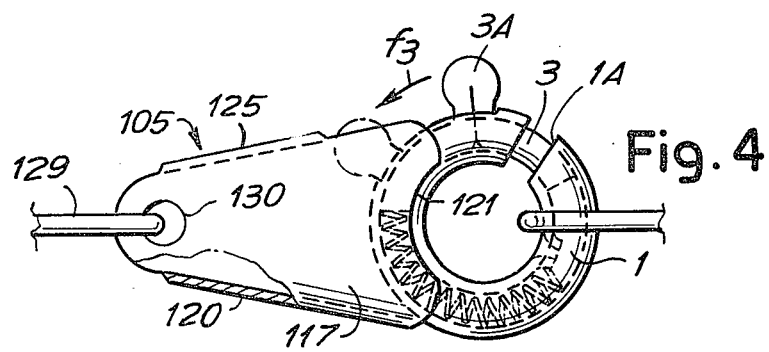
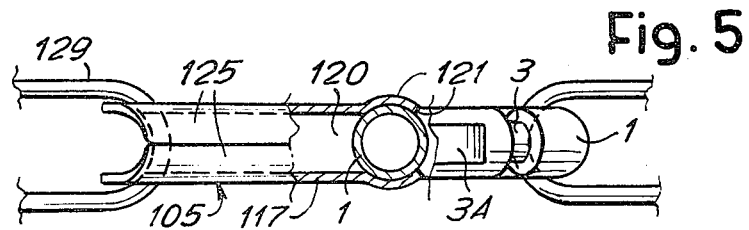

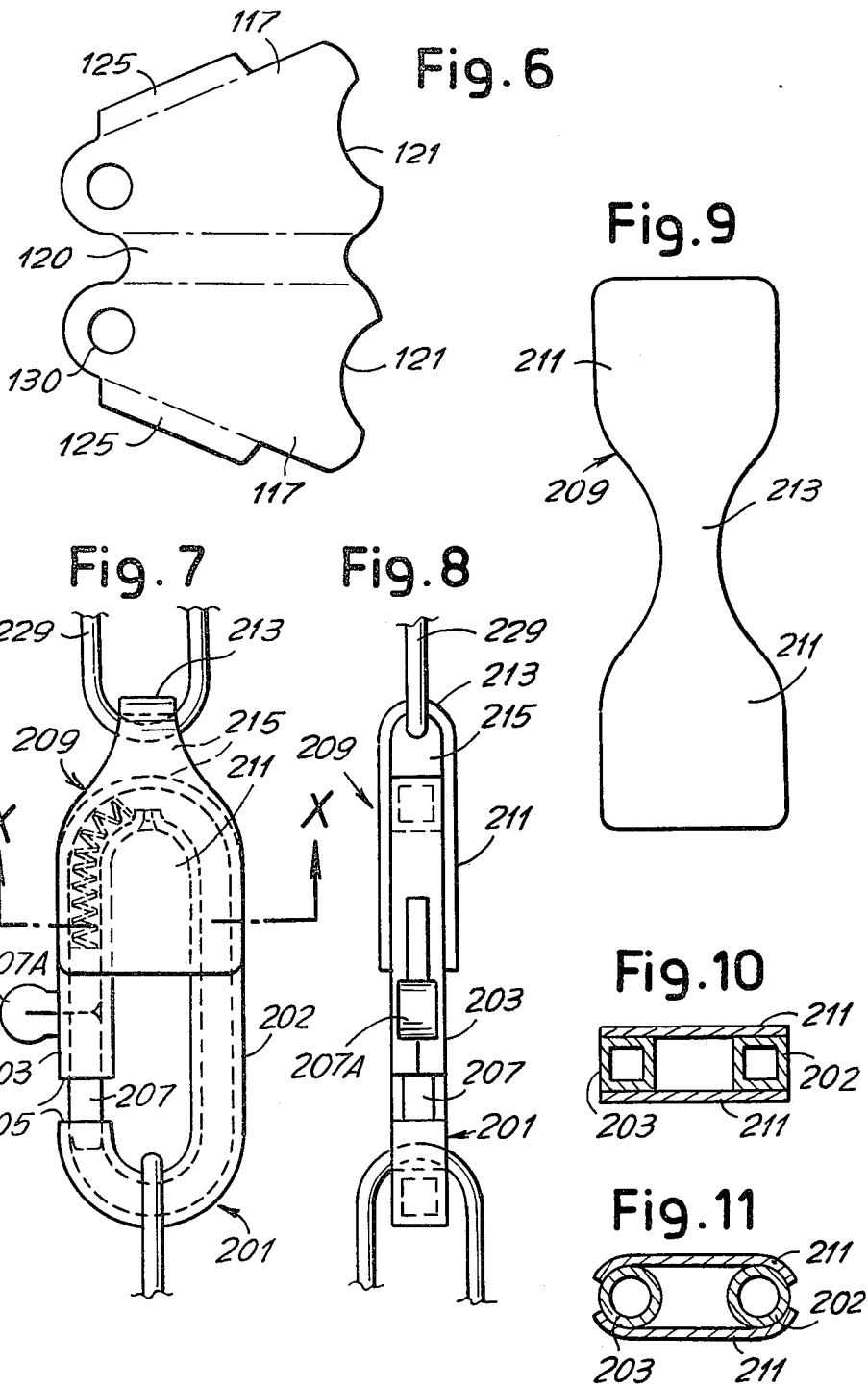

SPRING-RING CLOSURES FOR NECKLACE-COLLARS BRACELETS AND OTHERS

BACKGROUND OF THE INVENTION

The invention relates to a closure for chains, necklaces, bracelets and the like, having essentially as a securing means a conventional spring-ring with catch, designed to ensure the fixed clasp of one end of the necklace by means of an arrangement avoiding the conventional soldered or welded link and improving the closure in relation to the simple spring-ring arrangement.

SUMMARY OF THE INVENTION

The object of the invention is to provide a gapped spring-ring catch closure with a lug with two laminar portions approximately parallel with each other and connected to the spring-ring structure, to which they are secured. The two laminar portions have edges which are essentially at a tangent to the annular structure, and may have slightly curved edges matching the curvature of the annular structure.

The two laminar portions are formed from a single shaped laminar component which is folded back on itself. The laminar component may have a connecting bridge section, at the junction of the two laminar portions furthest away from the annular structure and at least one of the edges of the two laminar portions may have curved-back lips, masking the interspace between the said two portions. Alternatively, the laminar component may have a lateral connecting rib between the two laminar portions, on the part opposite the spring ring catch.

The end of the necklace may be secured to the bridge formed by the U-shaped bend of the laminar component, or by means of two aligned holes in the two laminar portions.

The invention will now be described by way of example with reference to the accompany drawings in which:

FIG. 1 is a plan view of a closure constructed in accordance with the invention, FIG. 2 is a side elevation view thereof, FIG. 3 is a plan view of blank for a laminar component used in the closure, FIG. 4 is a plan view of an alternative form of closure, FIG. 5 is a part cross-sectional view of the closure in FIG. 4, FIG. 6 is a plan view of a form of blank for a laminar component for use in the closure of FIG. 4, FIG. 7 is a plan view of a further alternative form of closure constructed in accordance with the invention, FIG. 8 is a side elevation view thereof, FIG. 9 is a blank for a laminar component for use in the closure in FIG. 7, FIG. 10 is a cross-sectional view on the line X-X in FIG. 7, and FIG. 11 is a cross-sectional view of a further alternative form of closure.

DESCRIPTION

FIGS. 1 to 3, show a closure having a clasp including a gapped tubular toroidal ring 1, containing a closure catch or pin 3 suitably curved and sliding therein against the action of an opposing spring, the catch or pin having an external projection 3A for use in the opening operation, against the action of the opposing spring. This assembly forms the conventional spring-ring, which though presenting a satisfactory solution in actuating the closure does not respond to renewed requests of an esthetic as well as of a functional nature.

Accordingly, as shown in the said FIGS. 1 to 3, there is included a lug 5 applied to the spring-ring closure, to provide an extension to the circular structure of the said ring. This lug 5 is made up typically of two laminar or flat portions positioned with their edged approximately tangential with respect to opposite sides of the toroidal structure of the ring 1; the said portions being made from a laminar component 15. As shown in FIG. 3 the laminar component blank is in the form of two approximately triangular portions 17 connected by a reduced bridge section 19, so that when folded into U shape at the bridge section 19, the two portions 17 lie substantially parallel with each other at a distance corresponding approximately with the diameter of the section of the toroidal ring 1. The two portions 17 end with slightly concave opposing edges 21, designed to match the curvature of the ring (1) at opposite sides thereof.

The laminar portions close to the edges 21 may be slightly distorted by means of arched impressions, to stabilise the relative positions of the component 15 and the ring 1, by slight elastic deformation and thereby with a slight pressure of the two portions 17 upon the ring 1. The assembly is then soldered or welded by means of easy operations, adopted conventionally in the gold-working trade, so as to ensure a completely rigid assembly.

The position of the lug 5 must be directed with a slight slope in relation to the opening 1A of the ring 1, the movement of the catch 3 being such as that indicated by the arrow f3 (against the loading of the resisting spring) when opening. The projection 3A can pass partly between the two laminar portions 17 formed by the component 15. The lug 5 consequently does not present an obstacle to opening operations.

The two portions 17, defining the two opposite faces of the lug 5 may have respective lips 23 which are folded back to meet closely along a side edge of the lug 5 opposite to the catch; in this manner the lug 5 appears to be of a solid nature; the lips 23 may be welded together. Corresponding lips 25 may also be provided on the opposing side, but of shorter length than the lips 23, to allow a suitable gap for partial movement of the actuating projection 3A of the catch 3. In this case, adjacent to the bridge section 19 the lips 23 and 25 are stopped in such a manner as to form an eyelet 27 for the end of the necklace 29, suitably anchored in a stable manner to the closure, at the said bridge section 19. The other end of the necklace is secured in the same manner as with conventional spring-rings.

It is also possible for the laminar component 15 to be drilled as indicated at 30 to secure the end 29 of the necklace, in a direction transverse with respect to the said end secured to the eyelet 27.

FIGS. 4, 5 and 6 show a variation whereby two portions 117 of a laminar component are connected together by a ribbed bridge section 120, completing one of the side edges of the lug 105 formed by the component 117 when folded back substantially parallel to each other; these two portions 117 have concave edges 121 designed (in the same way as the edges 21) to match the ring 1 thus forming a lug 105 similar to 5 in FIG. 1. Two aligned holes 130 may be provided at the end of the lug 105 located furthest from the ring 1, to secure the end 129 of the necklace to the closure.

At the edge of each of the two parts 117 opposing the ribbed bridge section 120, lips 125 (similar to the lips 25) may be provided to partly close the two laminar portions together, leaving an opening to allow the movement of the actuating projection 3A of the catch 3.

FIGS. 7 to 11 show a modified spring-ring design, arranged as an exdtended ring 201 with two straight stretches 202 and 203, the latter being interrupted at 205 to define a gap to receive a catch 207 and its associated actuating projection 207A. In this case also a laminar component 209 folded into U shape is provided, with two laminar portions 211 partly covering the extended ring and having a bridge section 213 defining with the ring 201 an eyelet 215 to ensure stable securing of the end 229 of the necklace. The laminar component 209 is welded to the two opposite faces 211 of the ring 201.

The spring-ring in any of the constructions may be of circular transverse section, as indicated in FIG. 11, or of a different section, such as square as illustrated in FIG. 10 for the rings 201, 202.

A number of other variations in shape and arrangement are possible without departing from the scope of the appended claims.

We claim:

1. A closure for a necklace-collar, bracelet and the like, comprising a spring-ring of gapped loop form, a sliding catch within the ring, a spring within the ring to urge the sliding catch towards a gap closing position, a lug secured to the spring ring for engagement with a non-gapped loop, the lug having two substantially parallel laminar portions connected to the spring ring by soldering or welding and a length greater than the diameter of the ring, said two laminar portions converging away from said spring-ring, the edges of said laminar portions attached to said spring catch being concavely curved in accordance with the curve of said spring-ring, said two laminar portions being formed from a single sheet of material folded in spaced relation, each said laminar portion having depending lateral lip portions covering the space between each of said laminar portions, the end opposite said spring-ring being free from said depending lips to permit the insertion of said non-gapped loop in coplanar relationship with said first spring-ring.

* * * * *